Dec. 7, 1965  O. J. POUPITCH  3,221,792
LOCKWASHER AND FASTENER ASSEMBLY
Filed April 8, 1963  2 Sheets-Sheet 1
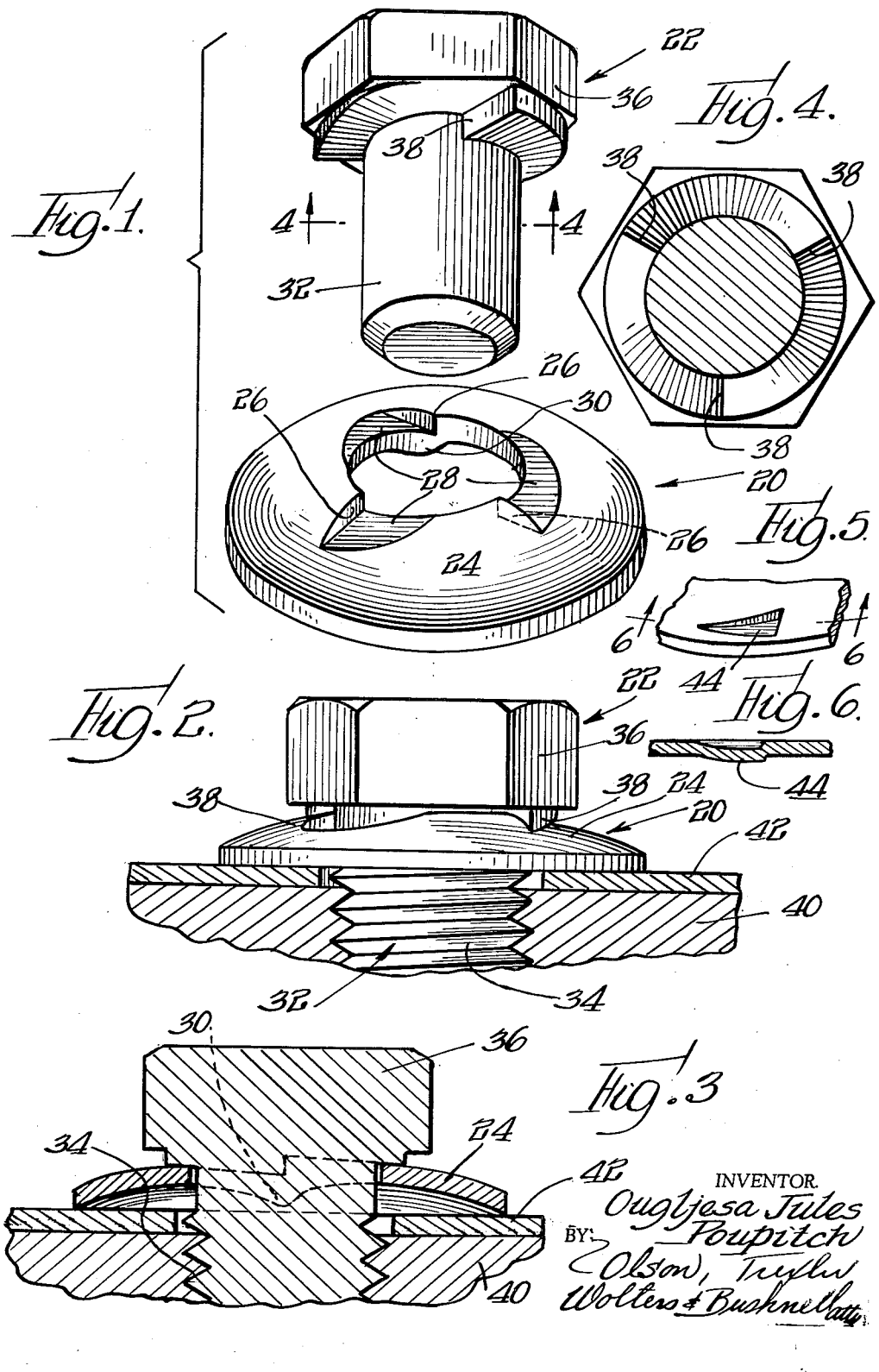
INVENTOR.
Ougljesa Jules Poupitch
BY Olson, Trexler, Wolters & Bushnell attys

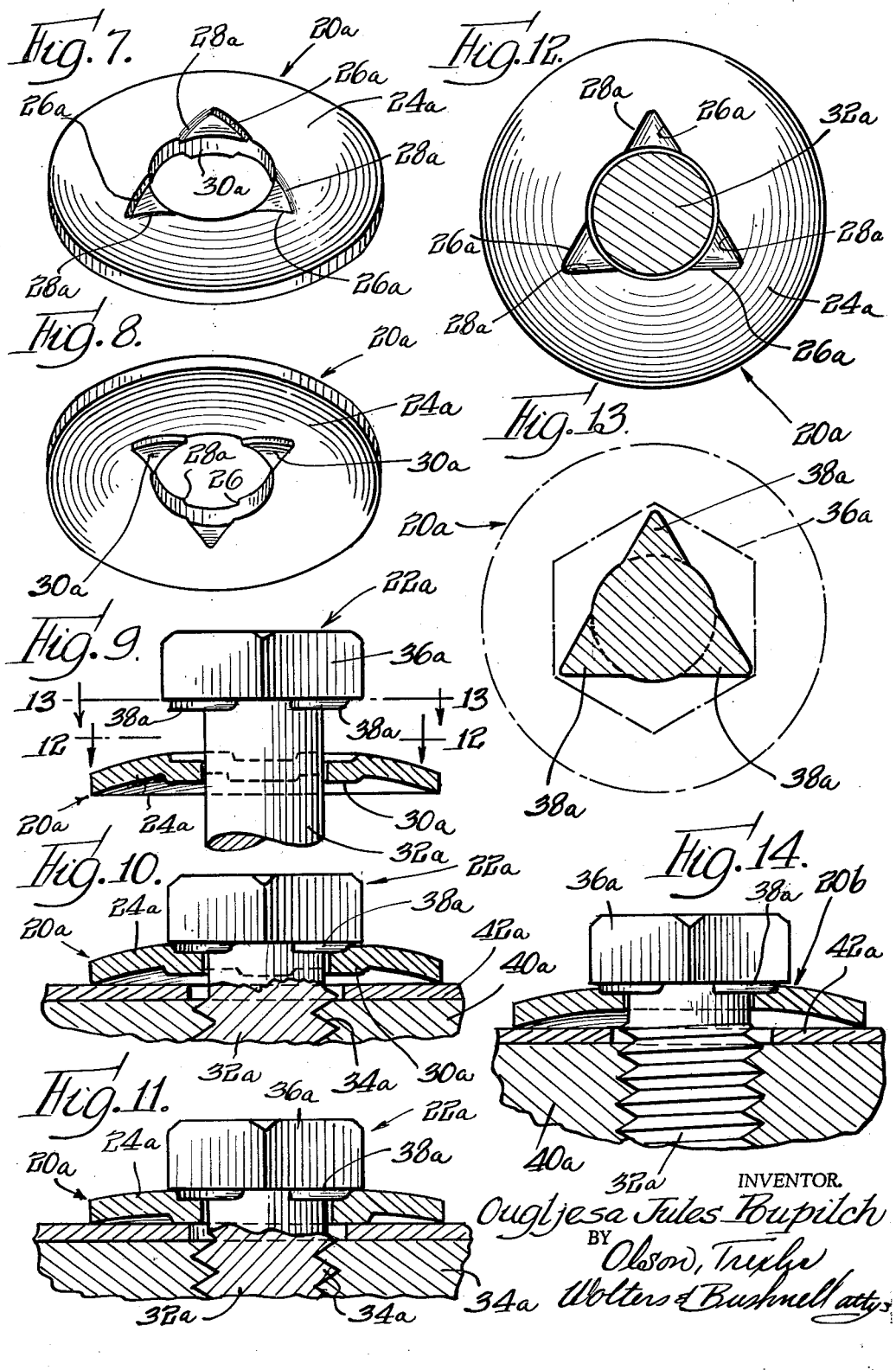

a corporation of Delaware
United States Patent Office 3,221,792
Patented Dec. 7, 1965

3,221,792
LOCKWASHER AND FASTENER ASSEMBLY
Ougijesa Jules Poupitch, Itasca, Ill., assignor to Illinois Tool Works Inc., Chicago, Ill., a corporation of Delaware
Filed Apr. 8, 1963, Ser. No. 271,174
4 Claims. (Cl. 151—38)

This invention relates generally to fasteners, and more particularly to fasteners of the type wherein lockwashers are employed to secure rotary threaded members such as nuts and screw members against loosening.

It has been found in many applications, that the most satisfactor locking devices for use beneath the clamping surfaces of nuts and screw members are dished washers, sometimes referred to as conical or dome-shaped washers. The present invention is concerned with the problem of so designing and employing such washers as to increase their locking efficiency. It is well known that when a dished or conical washer is clamped beneath a screw head or nut, stresses resulting from the tendency of the washer to flatten serve to counteract unauthorized loosening of the associated rotary threaded fasteners. It has been common practice in the use of resilient washers of the type referred to above for the clamping surface of a rotary threaded fastener to experience initial sliding contact with the crown of the washer, the frictional engagement of the outer margin of the washer being sufficient to secure the washer against rotation with respect to the work surface.

The present invention contemplates a new and improved fastening arrangement whereby upon initial clamping engagement of a rotary threaded fastener with the crown of a dished or conical type washer, said washer will experience contemporaneous axial stressing and some degree of rotation with respect to a work surface.

More specifically, the invention contemplates a washer of the type set forth above, which is adapted to be engaged along its inner margin during the initial clamping action of a rotary threaded fastener whereby to actually cause the washer to experience some degree of rotation as an incident to the rotary clamping engagement of a screw head or nut.

It is a further object of the present invention to provide an arrangement of the type set forth above wherein the clamping side of a rotary threaded fastener such as a screw head or nut is designed especially to coact with the crown or inner margin of a complementary washer so as to cause initial rotation of the washer with the workpiece contemporaneously with the axial stressing of the washer body.

Another object of the present invention is to provide a fastener of the type referred to above which is particularly adaptable for use in fastener units, namely units which comprise a dished or conical washer member preassembled with the clamping side of a screw head or nut.

Still more specifically, it is an object of the present invention to increase the locking efficiency of dished or dome-shaped washers of the type which may be stamped and formed from sheet metal stock at minimum production costs and likewise to produce economically rotary threaded fasteners especially designed to cooperate with the aforesaid washers.

In addition to the foregoing objects and advantages, it should be understood that the present invention contemplates the provision of means along the inner margin of a resilient dished washer which will not only function to assure some degree of rotation during the initial tightening or clamping of the washer against a work surface, but which will also cooperate in obtaining increased frictional resistance to unauthorized retrograde rotation of an associated rotary threaded fastener member such as a screw head or nut.

The foregoing and other objects and advantages will be more apparent from the following detailed description, when considered in connection with the accompanying drawings wherein:

FIG. 1 is a perspective view of a dished washer and screw blank prior to the telescopic association thereof;

FIG. 2 is a side elevational view disclosing the association of the screw blank and dished washer of FIG. 1 after the screw threads have been rolled or formed on the screw shank and said screw has been tightened within a complementary workpiece;

FIG. 3 is a view similar to FIG. 2, with the associated parts shown in central vertical section;

FIG. 4 is a transverse sectional view showing the clamping side of the screw member, said view being taken substantially along the line 4—4 of FIG. 1;

FIG. 5 is a fragmentary perspective view disclosing a structural modification incorporated along the outer margin of the dished washer of FIGS. 1-3, inclusive, to effect an increase in frictional resistance to retrograde rotation, said fragmentary view showing that portion embraced within the bracket indicated in FIGS. 1 and 2;

FIG. 6 is a fragmentary transverse sectional view taken substantially along the line 6—6 of FIG. 5;

FIG. 7 is a perspective view of a modified dished washer contemplated by the present invention, said view being taken from above the washer member;

FIG. 8 is also a perspective view of the washer of FIG. 7 as it appears from the underside of the washer;

FIG. 9 illustrates a screw blank partially inserted within the washer of FIGS. 7 and 8, said washer being shown in central transverse vertical section;

FIG. 10 is a view similar to FIG. 9, disclosing the screw blank of FIG. 9 formed with screw threads and the parts being shown in operative association with a complementary workpiece;

FIG. 11 is a view similar to FIG. 10, showing the screw member and dished washer completely tightened against the work surface with the internal lower margin of the washer being tightened into abutting relation with the workpiece;

FIG. 12 is a transverse sectional view of the screw blank of FIG. 9, taken substantially along the line 12—12 of said figure;

FIG. 13 is a cross-sectional view similar to FIG. 11, taken substantially along the line 13—13 of FIG. 9, illustrating the disposition of the lugs or abutment members associated with the underside of the screw head; and FIG. 14 is a view similar to FIG. 10, incorporating a dished washer of modified form wherein the inner margin along the crown of the washer is indented to accommodate the complementary lugs or abutments of the screw head without causing any deflection of the material along the inner margin of the underside of the washer.

Referring now to the drawings more in detail wherein like numerals have been employed to designate similar parts throughout the various figures, it will be noted that FIG. 1 illustrates the two elements or parts which form the structure of one embodiment of the invention. These parts consist of a dished or conical type resilient sheet metal washer designated generally by the numeral 20 and a complementary screw member designated generally by the numeral 22. When a dished washer such as the washer 20 is subjected to axial pressure along its inner margin or crown, as it is clamped against a workpiece (see FIGS. 2 and 3) the dished or conical body of the washer is placed under stress. Dished or conical type washers of conventional design are well known and the aforesaid axial flexing or stressing of the washer body to afford resistance to the loosening of a screw member or nut tightened thereagainst has heretofore been employed. The present invention is concerned with a fastening device in which the dished washer member such as the washer 20 is of special design, particularly along the inner margin thereof as shown in the various figures.

In the perspective view of FIG. 1, it will be noted that the crown or inner margin of the washer body 24 is formed with a plurality of uniformly distributed abutment members 26. Extending circumferentially or arcuately between the crest or high point of each abutment 26 to the bottom or low point of the next adjacent abutment in a clockwise direction, as viewed from the top of the washer 20 of FIG. 1, are cam surfaces 28. These abutments and their complementary cam surfaces may be produced along the crown of the washer 26 by conventional forming operations and it is preferred to so form the abutments as to provide a depending lug or abutment means 30 beneath each of the abutments 26. These lugs or abutment means 30 serve to prevent complete collapse of the washer body 24 and thus prevent the washer from being stressed beyond its elastic limit.

In FIG. 1, the screw 22 is shown before threads have been formed on its shank 32. After this shank 32 has been telescopically assembled with the washer 20, thread convolutions 34 (FIGS. 2 and 3) are preferably formed by a conventional rolling process. This rolling process increases the diameter of the screw shank sufficiently to trap the washer and thus present a preassembled fastener unit.

Particular attention is directed to the structural features incorporated on the underside of the screw head 36. The underside of the head 36 is formed with circumferentially separated abutment means 38 which are complementary with the abutment means 26 provided on the washer 20. When the washer and screw are preassembled as previously mentioned, it is preferable to permit free relative rotation between the washer and screw head prior to the application of the screw to the workpieces 40–42.

As the threaded screw shank 32 is turned within the complementary threaded aperture of the workpiece 40, the outer margin of the washer 20 is brought into engagement with the exposed surface of the workpiece 42. The purpose of the fastener in this instance is to secure the workpiece 42 to the workpiece 40. Ultimately the abutments 38 on the underside of the screw head 36, are brought into engagement with their respective abutments 26 on the washer 20. Thus as the washer is initially tightened against the surface of the workpiece 42, the outer margin of the washer experiences relative rotation as well as an increase in frictional engagement with said workpiece. Continued tightening of the screw within the workpiece 40 causes the annular resilient washer body 24 to be stressed axially. Obviously as the rotation of the washer continues, a point of stress is reached wherein the frictional engagement of the outer margin of the washer with the workpiece and the axial forces resulting from the tendency of the washer body to flatten prevents further normal tightening of the screw member 22. In some instances, depending upon the nature of the sheet metal stock and the purpose for which the fastener is to be used, the washer body 24 may be flattened until the lugs or abutments 30 are brought to bear against the external surface of the workpiece 42. Thus the washer under such conditions will have reached the limit of its collapse or flattening without being stressed beyond its elastic limit.

At this point it should be understood that the angle of inclination of the cam surfaces 28 extending from one abutment 26 to the next abutment, is preferably somewhat greater than the helix angle of the thread convolutions 34 of the screw member 22. In other words, forces tending to loosen the screw 22 must overcome increased frictional resistance between these cam surfaces 28 and the complementary engaging surfaces or areas on the clamping side of the screw head 36, in order to effect complete loosening of the screw.

In certain instances, it may be desirable to increase the frictional engagement of the outer margin of the washer body 24 with the workpiece 42 as the washer is tightened against this workpiece. To accomplish this, additional nubs or proturberances 44 may be provided at spaced intervals along the body 24 in the vicinity of the outer margin thereof as shown in FIGS. 5 and 6. The bracket shown at the lower portion of FIG. 1 identifies the area of the washer which is illustrated fragmentarily in FIGS. 5 and 6. In the disclosed embodiment, it is preferred to employ three equally spaced protuberances 44 along the outer margin of the washer body 24. These protuberances serve to increase frictional engagement of the washer with the work surface and thus increase forces which would be required to effect loosening of the screw member. These nubs or protuberances are illustrative of only one structural form of means which could be used for this purpose.

In FIGS. 7 to 13, inclusive, a modified form of the present invention is disclosed. The significant difference in structure between the fastener device shown in these figures and the fastener device previously described is found in the structure of the abutments and cam surfaces on the washer, and in the complementary driving abutments or lugs associated with the clamping side of the screw member. The washer of FIGS. 7 to 13 is designated generally by the numeral 20a and the screw member by the numeral 22a. The washer 20a is of dished form similar to the previously described washer 20 and incorporates an annular resilient or yieldable dished body portion 24a. The inner margin of the washer 20a, along the crown thereof, is provided with abutments 26a which are similar in function to the previously described abutments 26. Cam surfaces 28a are also associated with each abutment 26a. It will also be noted that depending lugs or protuberances 30a are provided to prevent complete collapse or flattening of the washer 20a when it is finally tightened against a workpiece as illustrated in FIG. 11.

The screw member 22a includes a shank portion 32a which is shown in FIG. 9 in the form of a screw blank before threads are rolled thereon. FIG. 9 shows the initial telescopic assembly prior to rolling threads on the shank, whereas FIGS. 10 and 11 illustrate the screw shank after thread convolutions 34a have been formed on the shank. The screw member 22a also includes a head 36a provided along the underside thereof with abutments or protuberances 38a which function similarly to the abutments 38, previously described, to cause initial rotation of the washer as it is tightened against workpieces 40a–42a. In instances where it is deemed desirable the annular body 24a of the washer 20a may be provided with protuberances, not shown, corresponding with the protuberances 44 disclosed in FIGS. 5 and 6. It will suffice to say that the fastener device disclosed in FIGS. 7 to 13, inclusive, functions similarly to the device shown in FIGS. 1 to 6, inclusive, in that during the initial tightening of the screw head and washer, the abutments or lugs 38a on the underside of the screw head impart rotation to the washer, and the washer contemporaneously experiences axial stress. Any tendency for the screw 20a to experience retrograde rotation is opposed by the cam surfaces 28a which are inclined at an angle with respect to the screw axis greater than the helix angle of the thread convolutions 34a. Obviously the inherent resiliency of the washer body under stress also cooperates in resisting unauthorized retrograde rotation of the screw member 22a.

FIG. 14 discloses a washer of slightly modified form, designated generally by the numeral 20b. This washer is similar in every respect to the washer 20a execept that the indentations or impressions made in the crown of the washer to provide the abutment means and cam surfaces are produced in the washer without depressing the underside of the washer. In other words, the underside of the washer 20b, along the inner margin thereof is free from the abutments 30a shown in FIGS. 7 to 13, inclusive. In all other respects the device shown in FIG. 14 has the same structural and functional characteristics of the device shown in FIGS. 7 to 13, inclusive.

From the foregoing it will be apparent that the present invention contemplates an improved fastening device which increases the locking efficiency of a dished or dome-shaped spring washer. The structural features embodied in the washer and the clamping surface of the screw head function in a new and unobvious manner to produce results heretofore not attainable by locking devices of conventional design. Obviously, the invention is not limited to the specific structural details disclosed and described herein but contemplates other changes and modifications without departing from the spirit and scope of the depending claims.

The invention is claimed as follows:

1. A locking device including a dished, axially resilient annular washer body of sheet metal having an upper surface and an underside and having an inner margin adapted to be positioned beneath the clamping surface of a rotary threaded fastener such as a screw head or nut, a plurality of individual abutment means impressed within and spaced circumferentially along said inner washer margin in the vicinity of the washer crown and beneath said upper surface in position to be engaged by corresponding abutment means on the clamping side of a rotary threaded fastener as an incident to rotary tightening of said fastener, circumferentially disposed cam surfaces along the washer crown sloping from a high point adjacent the top of one abutment means toward a low point in the vicinity of the base of the next adjacent abutment means, the inclination of said cam surfaces with respect to the washer axis extending in the same general direction as and being greater than the inclination of the thread convolutions of a complementary rotary threaded fastener with which the locking device is to be used, whereby to increase the effectiveness of the washer to resist loosening after said complementary threaded fastener has been rotated in a tightening direction to urge said washer abutment means in the direction of said rotation, the work engaging edge means of the washer being sufficiently limited in radial width to assure the desired degree of rotation of the washer during the initial clamping engagement thereof with a complementary work surface, and a plurality of circumferentially spaced individual lug means projecting axially from and integral with the underside of the washer body to prevent complete flattening of the washer, said lug means normally terminating short of a plane coincident with work engaging edge means of said body for permitting limited flattening of the washer, said lug means having work surface engageable areas of maximum axial extent substantially in axial alignment with said abutment means and circumferentially offset from the high points of said cam surfaces.

2. A locking device, as defined in claim 1, which includes three of said abutment means and said cam surfaces equally spaced along the inner washer margin.

3. A locking device, as defined in claim 1, wherein said washer body is of substantially uniform thickness throughout, said abutment means having a height less than said thickness and said lug means having an axial extent less than said thickness.

4. A locking device comprising a washer, as defined in claim 1, preassembled with the clamping side of a rotary threaded fastener member, abutment means on the clamping side of said rotary threaded fastener member engageable with said abutment means on the washer to effect initial rotation of the washer as an incident to rotary tightening of the fastener member, said washer being freely rotatable with respect to said threaded fastener member before tightening against a work surface.

References Cited by the Examiner

UNITED STATES PATENTS

| 221,299 | 11/1879 | Gray | 151—45 |
|---|---|---|---|
| 355,646 | 1/1887 | Gates | 151—41.5 |
| 595,215 | 12/1897 | Smith | 151—34 |
| 843,720 | 2/1907 | Waddell et al. | 151—41.5 |
| 2,321,155 | 6/1943 | Poupitch | 151—35 |
| 2,779,376 | 1/1957 | Poupitch | 151—38 |

FOREIGN PATENTS

| 7,166 | 5/1886 | Great Britain. |
|---|---|---|
| 6,425 | 5/1888 | Great Britain. |

CARL W. TOMLIN, *Primary Examiner.*

EDWARD C. ALLEN, *Examiner.*